UNITED STATES PATENT OFFICE.

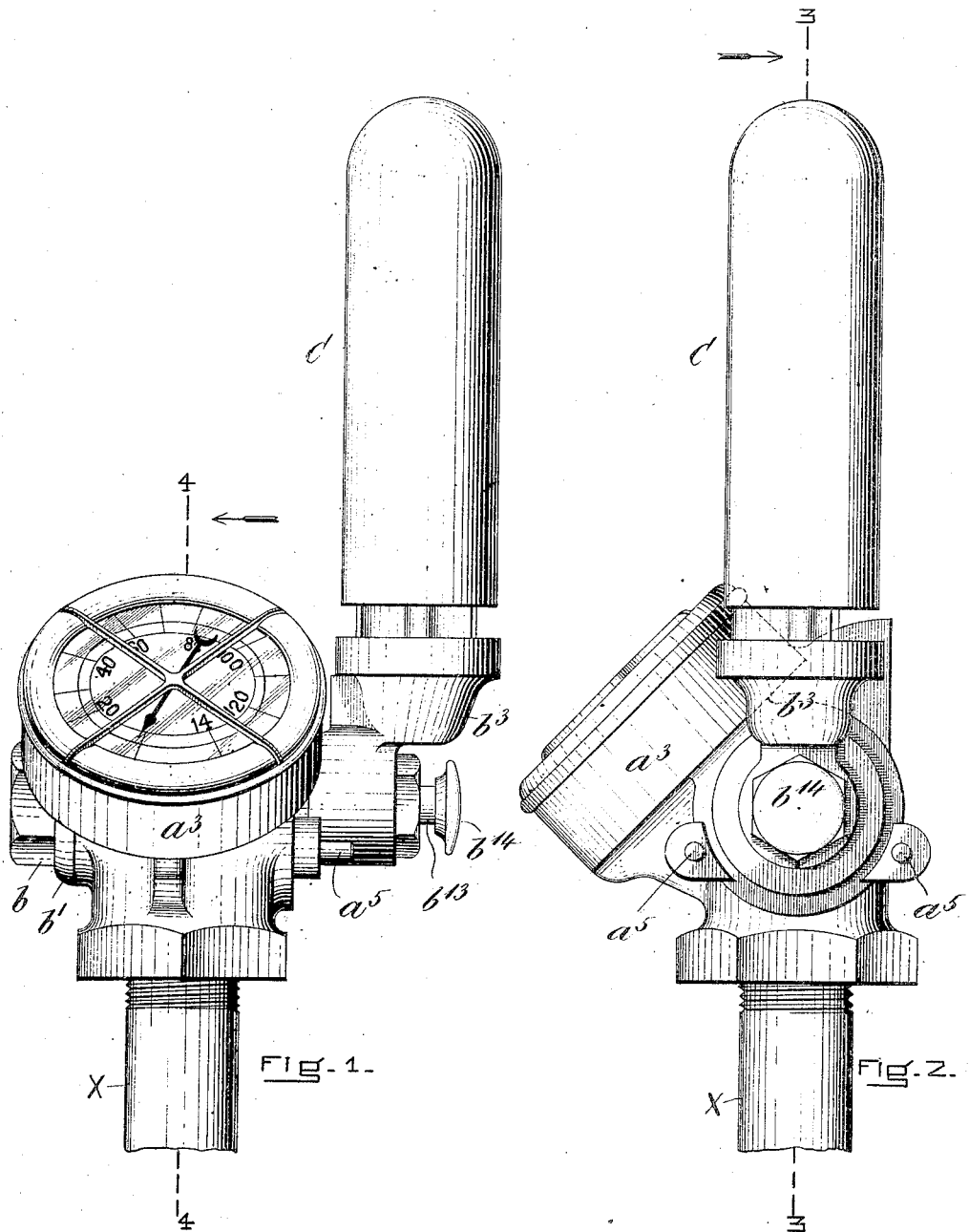

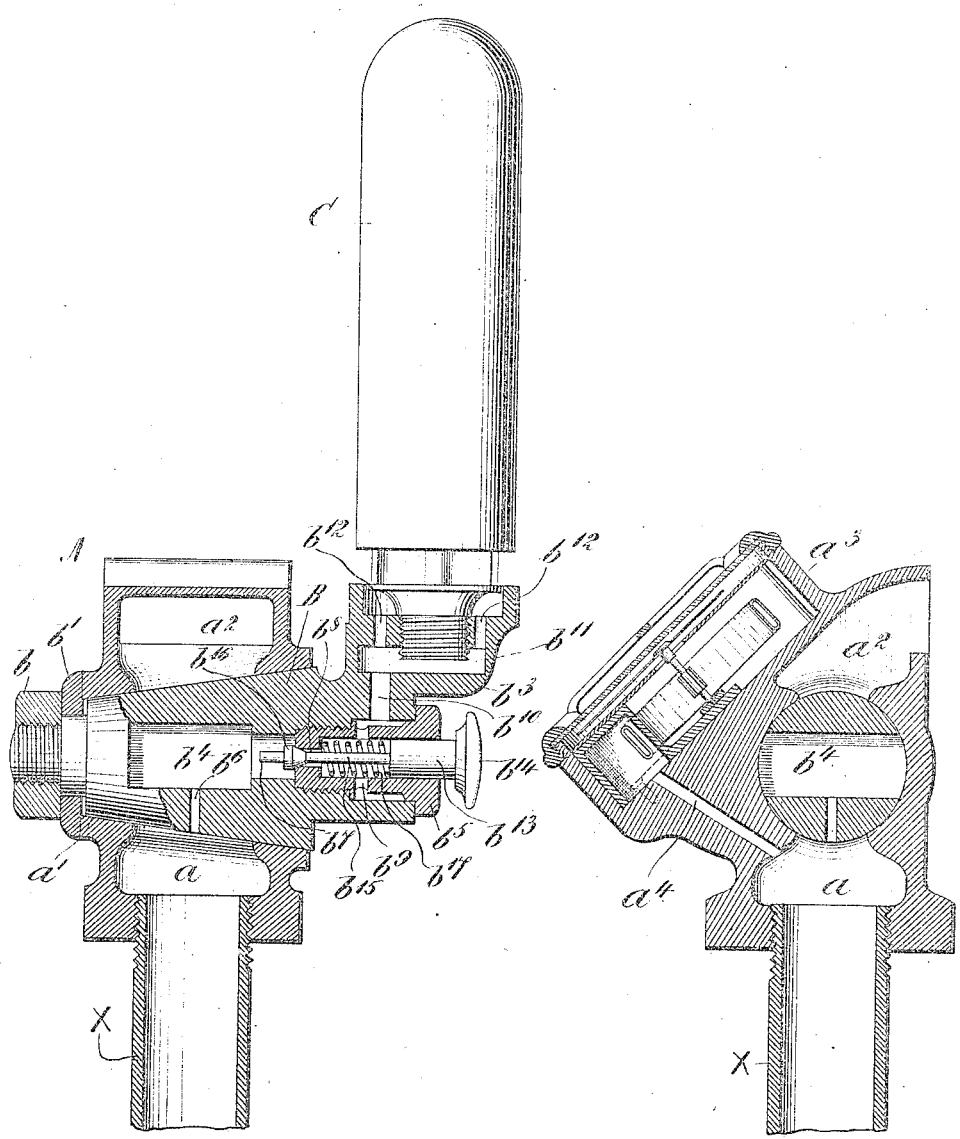

CHARLES W. SHERBURNE, OF BOSTON, MASSACHUSETTS.

SIGNAL-COCK.

975,645.

Specification of Letters Patent. Patented Nov. 15, 1910.

Application filed September 25, 1908. Serial No. 454,721.

*To all whom it may concern:*

Be it known that I, CHARLES W. SHERBURNE, of Boston, in the county of Suffolk and State of Massachusetts, a citizen of the United States, have invented a new and useful Improvement in Signal-Cocks, of which the following is a full, clear, and exact description, reference being had to the accompanying drawings, forming a part of this specification, in explaining its nature.

My invention relates to an improvement in signal cocks and especially to a signal cock for air brake systems like that shown in patent issued to Benjamin J. Graham May 8, 1900, No. 649,297, in which the cock is provided with an interior mechanism or valve worked by a handle or lever serving also as a whistle so that the cock may be used either for releasing air from the brake system for stopping a train or as a whistle or alarm when, for example, a train of cars is moving backward and it is desired to warn a person on the track, this being accomplished by so operating the cock that compressed air from the brake system may be liberated through the operating arm or handle for sounding the whistle.

The object of my present invention is to improve upon the construction shown in the aforesaid patent by providing means whereby air from the brake system may be liberated for blowing the whistle without the necessity for moving the handle or lever by which air is released from the brake system for setting the brakes. If the turning of the same handle or lever is relied upon for accomplishing the release of sufficient air from the brake system to blow the whistle, care must be exercised lest the handle or lever be turned too far and such amount of air be released from the brake system as to set the brakes.

My invention relates also to various structural details all of which can best be seen and understood by reference to the drawings in which—

Figure 1 shows the device in front elevation. Fig. 2 is a side elevation of the device. Fig. 3 is a section on the line 3—3 of Fig. 2. Fig. 4 is a section on the line 4—4 of Fig. 1.
In the drawings:—A represents the body of the cock connected to a pipe X which connects with or forms a part of a brake system or other apparatus not shown. The body A comprises a casting formed to provide an inlet passage $a$ into which the air first enters from the pipe X, an interior valve chamber $a^1$ which connects with the inlet passage $a$ and an outlet passage $a^2$ which proceeds from the valve chamber. On the side of the body of the valve is preferably formed a casing $a^3$ for containing an indicator the mechanism of which is influenced by air from the inlet passage $a$ by way of a by-passage $a^4$. Located within the valve chamber $a^1$ is a plug valve B. This is held in place to be turned within the valve chamber by a nut $b$ and washer $b^1$ arranged upon the contracted end of the valve extending outside the valve chamber and bearing against the side of the body of the cock. Attached to and projecting angularly from the forward end or head of the valve B outside the valve chamber $a^1$ is a bracket $b^3$ into the end of which screws a whistle C. This whistle forms the lever or handle by which the valve is turned in the valve chamber. Extending crosswise through the body of the valve is a passage $b^4$ which when the valve has been turned to an open position is in communication with both the inlet passage $a$ of the cock and its outlet passage $a^2$ by which air entering the passage $a$ may pass through the valve and escape through the outlet passage. Upon turning the valve to a reverse or closed position the air will be entirely cut off. It may be determined when the valve has been turned to a proper open position by means of the lugs $a^5$ projecting from the side of the body of the cock. These lugs are arranged whereby either one or the other of them will be struck by the bracket $b^3$ projecting from the end of the valve when the valve has been turned by the handle or lever to a closed position, the relative disposition of the lugs, in other words, being such that the engagement between the bracket and lugs will occur when the valve has been turned sufficiently to insure a proper opening of it the lugs defining such position depending upon the direction in which the valve is turned.

With respect now to the means employed for blowing and regulating the operation of the whistle: Threaded into the head of the valve B is a chambered plug $b^5$. The chamber of this plug forms a portion of the chain of connecting passages by which air may pass from the inlet passage $a$ of the cock to the whistle for blowing it. This chain of connecting passages comprises first the small by-passage $b^6$ extending from the inlet passage $a$ of the cock through the valve to communicate with the cross passage $b^4$ through it. The by-passage $b^6$ through the valve is preferably arranged to extend in a direction approximately at right angles to the passage $b^4$ through the valve so that when the valve is in a closed position the by-passage $b^6$ will be in constant communication with the inlet passage and air may enter the passage $b^4$. In this connection it should be observed that when the valve is closed the passage $b^4$ forms with the valve an air chamber formed in part by the portions of the valve lining the passage and in part by the wall of the valve chamber. From the passage or chamber $b^4$ there extends toward the head of the valve a passage $b^7$ which is continued through the end of the plug $b^5$ by a passage $b^8$. From thence communication is had through the sides of the plug by ports or passages $b^9$ which communicate with a passage $b^{10}$ formed in the bracket $b^3$. The passage $b^{10}$ communicates with a chamber $b^{11}$ formed below the whistle from whence the air may strike against and sound the whistle by way of a series of passages $b^{12}$.

Arranged in the forward end of the chamber of the plug $b^5$ to slide therein is what may be termed a sliding piston $b^{13}$ having a push button $b^{14}$ arranged upon the end thereof. Projecting from the end of the piston $b^{13}$ and extending through the chamber of the plug and out through the passage $b^8$ in the end thereof is a rod $b^{15}$. On this rod outside the end of the plug $b^5$ is an auxiliary valve $b^{16}$ which is adapted to close for a seat against the end of the plug around the passage $b^8$ through it, closing said passage. The auxiliary valve is held in a normally closed position by means of a spring $b^{17}$ arranged upon the rod $b^{15}$ and interposed between the end of the sliding piston $b^{13}$ and the inside end of the plug. The auxiliary plug being accordingly held in a normally closed position, air cannot normally pass to the whistle. By pressing upon the button $b^4$, however, the piston $b^{13}$ will be advanced overcoming the spring bearing against it and the valve $b^{14}$ will be forced from its valve seat when the air from the inlet passage $a$ may have clear communication to the whistle for sounding it. In other words, the whistle can be sounded at any time the operator may desire simply by pressing upon the button $b^4$. It is also to be observed that the whistle may be sounded when the valve is either in a closed or an open position. As said before, the disposition of the by-passage $b^6$ is such as to remain in communication with the inlet passage $a$ as long as the valve remains in a closed position and when the valve has been turned to an open position then the air will have direct access to the passage $b^4$ when though the main portion of the air will escape by way of the outlet passage $a^2$, a sufficient amount of air may pass to the whistle for blowing it should one desire to blow the whistle at this time.

Having thus fully described my invention, I claim and desire to secure by Letters Patent of the United States:—

1. In a cock of the character specified, the combination of a body having inlet and outlet passages and a valve chamber between said passages, a main valve operable within said valve chamber, a whistle, said main valve having a cross passage through it forming a connection between said inlet and outlet passages when said valve is open, said main valve having also a by-passage extending from said inlet passage to said cross passage when said main valve is in a closed position and a further passage extending from said cross passage and connecting with said whistle, an auxiliary valve for controlling the aforesaid passage connecting with said whistle, and means for controlling said auxiliary valve whereby it may assume a normally closed position or be opened as occasion may require.

2. In a cock of the character specified, the combination of a body having inlet and outlet passages and a valve chamber interposed between said passages, a valve having a passage extending through it and arranged to connect said inlet and outlet passages when said valve is in an open position, said valve also having a by-passage through it by which air from the inlet passage may be directed into the interior of the valve when the valve is in a closed position, a whistle connecting with the head of said valve and serving as a handle for operating it, said whistle being in communication with the interior of said valve by which air let into the same may be directed to said whistle, a chambered plug fitting into the head of said valve and connecting with the interior thereof, the chamber of said plug forming a part or portion of the connection for directing air from the interior of said valve to said whistle, a piston arranged to slide within the chamber of said plug and be manually controlled to slide from outside the same, a rod carried by said piston and extending through the chamber of the plug and through the end thereof, an auxiliary valve arranged upon said rod and adapted to close against the end of said plug for a valve seat for controlling the passage through the same, and means for holding said auxiliary valve in a normally closed position controlled by said sliding piston.

CHARLES W. SHERBURNE.

Witnesses:
FRED. W. WHITELEY,
RICHARD M. TOPHAM.